United States Patent
Lee et al.

(10) Patent No.: US 6,377,273 B1
(45) Date of Patent: Apr. 23, 2002

(54) FAST AREA-COVERAGE COMPUTING METHOD FOR ANTI-ALIASING IN GRAPHICS

(75) Inventors: Ruen-Rone Lee, Hsinchu; Shin-Ping Robert Wang, Tooyuan; Kuo-Chang Fu, Keelung, all of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/186,502

(22) Filed: Nov. 4, 1998

(51) Int. Cl.[7] .............................. G09G 5/36; G06K 9/40
(52) U.S. Cl. ........................................ 345/611; 382/269
(58) Field of Search ................................. 345/681, 440, 345/611, 673, 613, 660, 694, 695; 382/269

(56) References Cited

U.S. PATENT DOCUMENTS

| | | | | |
|---|---|---|---|---|
| 5,544,294 A | * | 8/1996 | Cho et al. | 345/441 |
| 6,057,855 A | * | 5/2000 | Barkans | 345/435 |
| 6,271,850 B1 | * | 8/2001 | Kida et al. | 345/422 |

* cited by examiner

Primary Examiner—William A. Cuchlinski, Jr.
Assistant Examiner—Thu Nguyen
(74) Attorney, Agent, or Firm—Proskauer Rose LLP

(57) ABSTRACT

A pixel based method for the computation of sub-pixel area-coverage is implemented in an area-coverage hardware module, within a 3D computer graphics rendering engine. Unlike the prior art segment based method which requires an operating aperture of an entire segment, the present invention only requires an operating aperture of one pixel. Therefore, the overall system pixel yield rate is increased.

5 Claims, 3 Drawing Sheets

FAST AREA-COVERAGE COMPUTING METHOD FOR ANTI-ALIASING IN GRAPHICS

RELATED CASE

U.S. patent application Ser. No. 09/033,351, entitled "AN IMPROVED METHOD FOR RENDERING A 3D COMPUTER IMAGE OF A TRIANGLE", has been filed on Mar. 2, 1998. Now U.S. Pat. No. 6,266,065 and is assigned to the assignee of the present application. The above application contains subject matter related to the subject matter of the present application and is incorporated herein by reference.

FIELD OF THE INVENTION

The present invention relates to a computing method for 3D graphics. More specifically, the present invention relates to a pixel based fast area-coverage computing method for anti-aliasing in 3D graphics applications.

BACKGROUND OF THE INVENTION

In the prior art of high-end 3D computer graphics, the pixels of an image are sub-divided into sub-pixels, and an area-coverage computing technique is employed to resolve the aliasing effect common to graphics imaging. That is, an anti-aliasing method is used which assigns pixel colors based on the fraction of the pixel area that is covered by the image being rendered. Various prior art examples of anti-aliasing methods are described in U.S. Pat. No. 4,908,780, by Priem, et al. (1990); and U.S. Pat. No. 5,299,308, by Suzuki, et al. (1994).

For real time anti-aliasing operation in the prior art, the segment based area-coverage computing method is generally used. That is, a set of consecutive pixels on a scan line constitute a segment, which is evaluated as an entity, utilizing existing graphics pipelines within a system, so that no additional hardware is required. However, because the pixel data is accumulated in segments, there are inherent time delays involved, which adversely affect the overall system pixel yield rate.

To illustrate the need for an anti-aliasing technique, FIG. 1 shows a screen geometric of pixels and an aliased triangle image. The dash-lined lattice constitutes the geometric coordinate system for pixels. The geometric center of each pixel is located at the point where the vertical and horizontal dash lines intersect. The solid-lined lattice is appended to indicate the pixels' shape. Scan lines are horizontal lines which cross the geometric center of the pixels. The scan lines are shown as horizontal dash lines.

In graphics without anti-aliasing, as in FIG. 1, not all of the pixels on the edges are drawn. That is, a pixel is drawn only when it is interior to the edges of the triangle. More specifically, for a pixel on the left edge, it is drawn only if the point where the left edge and scan line intersect is located to the left of the pixel's geometric center. Similarly, for a pixel on the right edge, a pixel is drawn only if the point where the right edge and scan line intersect is located to the right of the pixel's geometric center. A pixel on an edge is considered to be covered when it is interior to the edge. For example, pixels A and B in FIG. 1 illustrate the left and right edge cases, respectively, and are considered to be covered. Therefore, for a pixel to be drawn on an aliased triangle, it must be either interior to the triangle, or it must meet one of the edge conditions, as described above. This is the primary rule for determining whether or not a pixel should be drawn on an aliased image.

As a result, the pixel edges are drawn in a staircase fashion, as shown in FIG. 1. The staircase shape is known in the art as "jagged", and the phenomenon that causes the "jaggies" is called aliasing.

There are two approaches used in the graphics art to suppress the aliasing effect. First, all the pixels that intersect the edge lines, whether covered or not, are taken into account. Second, a pixel is drawn by blending its color (foreground color) with the background color. The amount of blending (ratio of foreground color to background color) is proportional to the pixel's area that is covered by the edge line. FIG. 2 illustrates the same triangle as in FIG. 1, with the addition of all the "uncovered" pixels that intersect the edge lines. As shown in FIG. 2, the jaggies are reduced. However, a method is required for computing the area-coverage of an edge over a pixel.

Calculating a pixel's area-coverage may be accomplished by dividing each physical pixel into logical sub-pixels. FIG. 3 depicts an enlargement of the second row of the triangle and pixels shown in FIG. 2. In general, a pixel is divided linearly in both the x-direction and y-direction by a number n, which is a power of two. Accordingly a total of $n^2$ sub-pixels are generated. In FIG. 3, n=4, so that $n^2$=16 sub-pixels for each pixel.

After dividing each pixel into sub-pixels, each sub-pixel is tested to determine whether or not it is interior to the edges. The same edge intersection rule is applied as in the aliased case, described above, except that the test is now run on sub-pixels, rather than on pixels. Testing of the sub-pixels can be implemented without the need for additional hardware, since the same hardware module used for testing pixels can be implemented to test sub-pixels. This is the most commonly used approach in the prior art.

The outcome of each sub-pixel's test is accumulated in a memory buffer. When all of the sub-pixels of a pixel have been tested, the accumulated test result is retrieved from memory. This accumulated test result represents the area-coverage of the pixel.

In the prior art implementation, the tests must be performed in scan-line order. Consequently, the test operation has to complete all n sub-pixel scan-lines of a segment before the coverage of a pixel is determined. Since the aperture of this type of test operation is the entire segment, this method is categorized as a segment based area-coverage computing algorithm.

In the FIG. 3 example, there are approximately $3 \times n^2$ sub-pixels along the path to be tested. Since the computation of area-coverage for each pixel must wait for n sub-pixel scan-lines to be completely tested, delays are introduced into the test operation. As such, the segment based area-coverage method has the disadvantage of slowing down the rate of pixel yield.

Accordingly, it is an object of the present invention to overcome this disadvantage of the prior art by using a pixel based method and apparatus for sub-pixel area-coverage, which does not incur the inherent testing delays of the segment based method.

SUMMARY OF THE INVENTION

In accordance with an illustrative embodiment of the present invention, a pixel based method for computing the area-coverage of an image bounded by edges is as follows:

a) selecting a segment of the image to be evaluated for area-coverage, the segment being made up of a set of consecutive pixels on a scan-line section which intersects at least one of the boundary edges, b) dividing each of the pixels into an n by n sub-pixel array, with n rows and n columns, where n is a number equal to a power of 2, and where the sub-pixel array has n sub-pixel scan-lines, with each sub-pixel scan-line crossing the geometric center of each row of sub-pixels, c) selecting one of the sub-pixel arrays to constitute a current pixel for area-coverage evaluation, d) determining the x-axis coordinates of the intersection points of the sub-pixel scan-lines of the current pixel with at least one of the boundary edges of the image, e) comparing these x-axis coordinates with the x-axis coordinate of the current pixel, f) determining from this comparison an area-coverage value for each of the sub-pixel rows within the current pixel, g) accumulating the area-coverage values for all of the sub-pixel rows within the current pixel, and h) normalizing the accumulated area-coverage values to determine an area-coverage value for the current pixel.

The inventive method described above is implemented in an inventive hardware module which is appended to a conventional graphics rendering engine. The resulting increase in overall system pixel yield rate as compared to the prior art segment based method is more than adequate compensation for the additional cost of the inventive hardware module.

An illustrative embodiment of the present invention is more fully described below in conjunction with the following drawings.

DETAILED DESCRIPTION OF THE INVENTION

Figure 1:
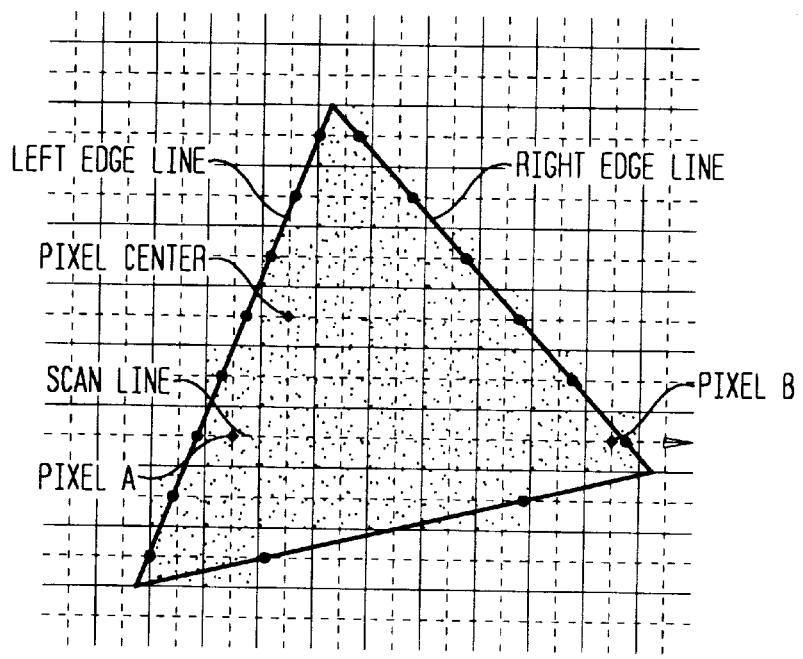
FIG. 1 is a screen geometric of aliased pixels and triangle.
Figure 2:
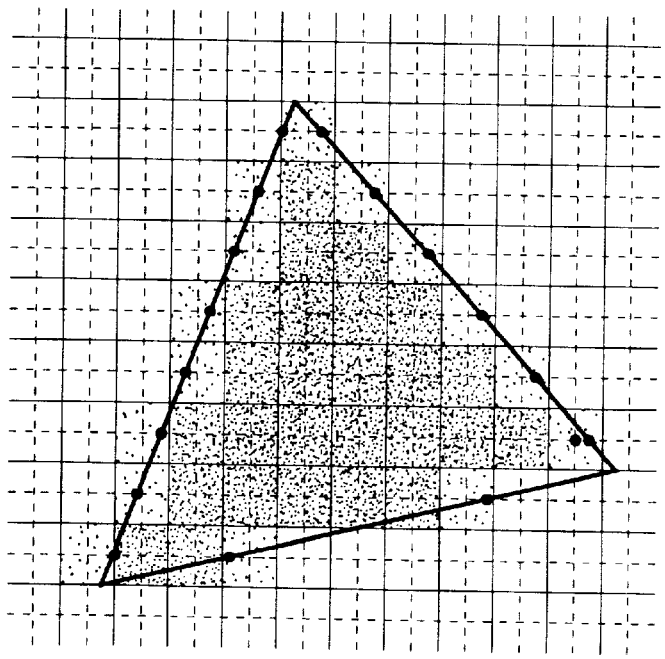
FIG. 2 is a screen geometric of anti-aliased pixels and triangle.
Figure 3:
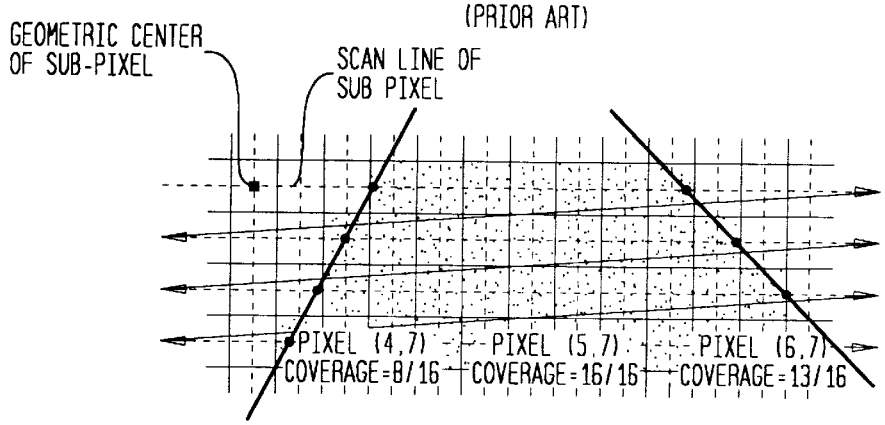
FIG. 3 is a sub-pixel detail of a segment of FIG. 2.
Figure 4:
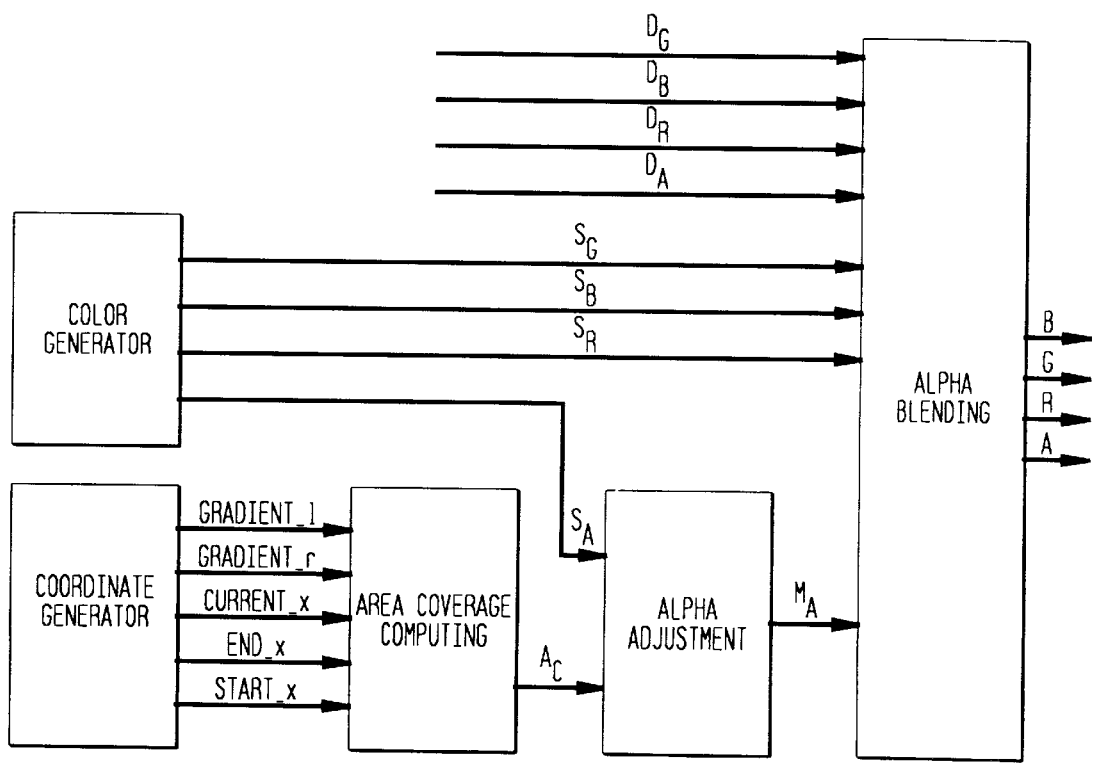
FIG. 4 is a block diagram of a graphics rendering engine, in accordance with the present invention.

One embodiment of the present invention is shown in FIG. 4, which depicts a graphics rendering engine in block diagram form. There are five modules in the diagram, which are functionally described below.

Rendering of a pixel is initiated by the Color Generator module and the Coordinate Generator module. The Color Generator module provides the color attributes of a target pixel, including Source Red ($S_R$), Source Blue ($S_B$), Source Green ($S_G$), and Source Alpha ($S_A$). The Coordinate Generator module provides the geometric attributes of the corresponding segment in which the target pixel resides. The geometric attributes include the left edge starting position (Start_x), the right edge ending position (End_x), the current pixel position (Current_x), the gradient of the left edge (Gradient_l), and the gradient of the right edge (Gradient_r).

These geometric attributes are inputted to the Area Coverage Computing module, which is the inventive apparatus disclosed herein. Importantly, the Area Coverage Computing module implements the inventive pixel based area-coverage computing algorithm, in order to compute the effective area of the target pixel.

The computed pixel area-coverage ($A_C$) is outputted to the Alpha Adjustment module and combined with the source alpha ($S_A$) from the Color Generator. The resulting modified source alpha ($M_A$) is outputted from the Alpha Adjustment module to the Alpha Blending module.

In the Alpha Blending module, the modified source alpha ($M_A$) is combined with Source Red ($S_R$), Source Blue ($S_B$), and Source Green ($S_G$) from the Color Generator module. Together, they define the current pixel's color, or the so-called foreground color. The Alpha Blending module also blends the pixel's color (foreground color) with the background colors ($D_A, D_R, D_B, D_G$) that follow the modified alpha value $M_A$. The output of the Alpha Blending module is then drawn on a screen.

Notwithstanding the aforementioned assumptions, the inventive algorithm can be applied directly to the general case.

The present invention provides a method and apparatus for computing the current pixel's effective area covered by an edge line. The inventive apparatus is the Area Coverage Computing module, as shown in the rendering engine of FIG. 4. The inventive method is a pixel based area-coverage computing algorithm, which is implemented by the Area Coverage Computing module. Unlike the prior art segment based area-coverage computing algorithm, the inventive algorithm tests $n^2$ sub-pixels of the target pixel "locally". That is, the pixel is tested independently of the other neighboring pixels of its segment. Therefore, the excessive processing latency of the prior art segment based method is avoided, as explained in the following discussion.

In the following description of the inventive algorithm, a few assumptions have been made for simplification. These include:

1. The direction of drawing a segment is always from left to right.
2. The description only covers monochrome color.
3. The rendering of pixels is ordered in a front to back fashion.

Referring again to FIG. 4, the inputs to the Area Coverage Computing module from the Coordinate Generator module are the coordinate attributes of a segment (Gradient_l, Gradient_r, Current_x, End_x, and Start_x). The geometric attributes of the segment are illustrated in FIG. 5, where the shaded pixels constitute the segment.

Figure 5:
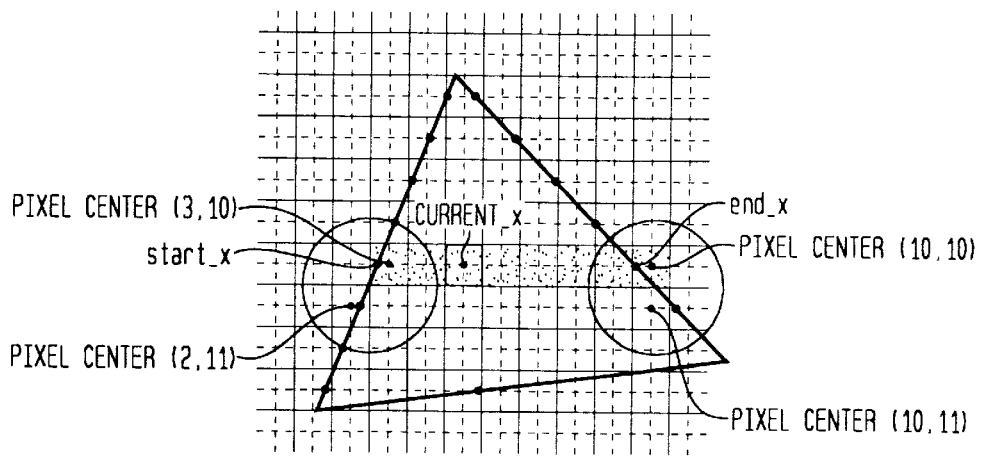
FIG. 5 illustrates the geometric attributes of a segment.

As shown in FIG. 5, start_x is the starting edge point of the segment, end_x is the ending edge point of the segment, and current_x is the current pixel position. Please note that current_x can assume any pixel position in the segment.

The inventive algorithm is implemented by the Area Coverage Computing module to calculate the current pixel's area-coverage value ($A_C$), based on the input segment attributes described above.

Geometric attribute start_x represents the x-coordinate of the left edge intersection with the current segment. Similarly, attribute end_x represents the x-coordinate of the right edge intersection with the current segment. Note that these coordinate values are real numbers, and are common to all of the pixels in the segment. Also, current_x is an integer value, which indexes the particular pixel to be drawn.

Figure 6:
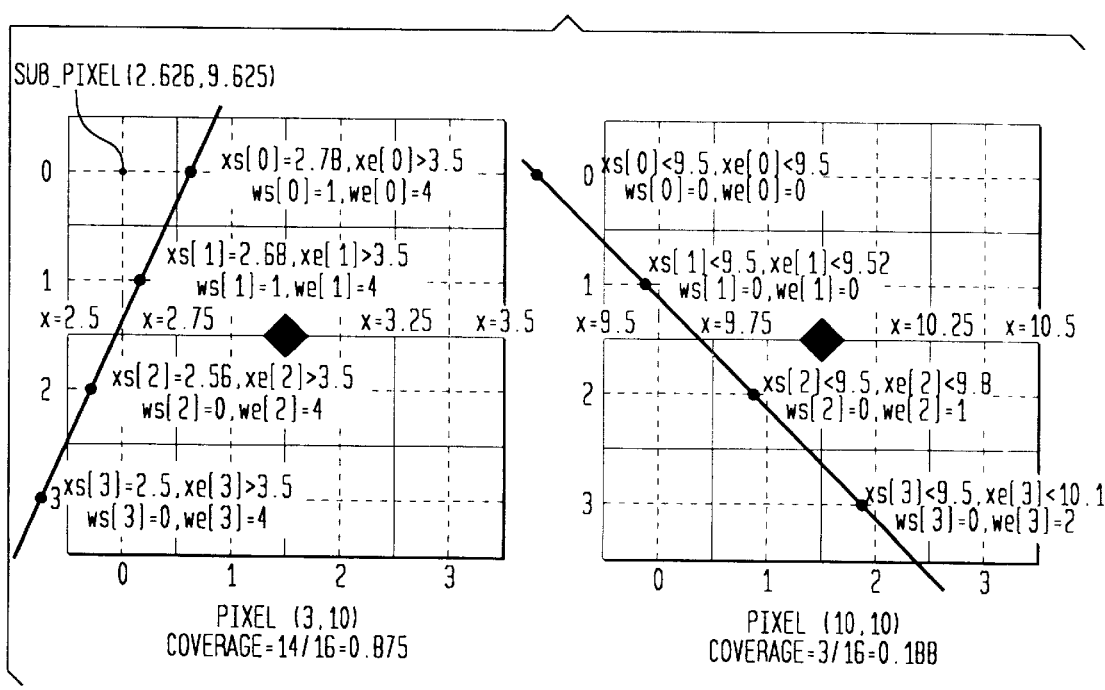
FIG. 6 depicts the computation of sub-pixel area-coverage, in accordance with the invention.

The inventive algorithm divides the current pixel into n by n sub-pixels. To index these sub-pixels, the original integer coordinate system is expanded fractionally, with a resolution of 1/n. This is illustrated in FIG. 6, where pixels (3,10) and (10,10), from FIG. 5, are shown in expanded detail. In the FIG. 6 example, each pixel is divided into a 4 by 4 sub-pixel array, and the intersection points of the edges and the sub-pixel scan-lines are indicated by round dots.

The inventive algorithm traces the edge lines by using the gradient information (Gradient_l and Gradient_r) inputted to the Area Coverage Computing module, and determines the edges intersection points at each sub-pixel scan-line. As a result, the intersection points are identified on both left and right edges, and are represented by xs[i] and xe[i], respectively. The symbol i designates the sub-pixel scan-line number, where i=0, . . . , n−1. The values of xs[i] and xe[i] are common to all the sub-pixels on the same sub-pixel scan-line i of the segment.

The value of current_x is then compared to xs[i] and xe[i]. This comparison is made n-entries of the row at a time. Note that the current_x pixel position is an integer. Then, if current_x=x, the current pixel's left edge=x−0.5, and the current pixel's right edge=x+0.5. In FIG. 6, the two expanded pixels are shown at x=3 and x=10.

For each row [i] of the current pixel, the following conditions are examined:
  (Condition_0) if xs[i]<=x−0.5,
  (Condition_1) if x−0.5<xs[i]<x+0.5
  (Condition_2) if x+0.5<=xs[i],
  (Condition_3) if xe[i]<=x−0.5
  (Condition_4) if x−0.5<xe[i]<x+0.5
  (Condition_5) if x+0.5<=xe[i]

Based on the above comparisons, a set of weights ws[i] and we[i] are assigned to each row [i]. The contribution to the coverage area by a row [i] is determined by subtracting ws[i] from we[i]. The following rules determine the values of ws[i] and we[i]:
  Rule 1: Condition_2 and Condition_3 indicate that a row [i] of the current pixel is neither on the edge nor inside the triangle. Therefore, the area contribution to the pixel is zero.
  Rule 2: Condition_0 and Condition_5 indicate that a row [i] is interior to the triangle. The weights ws[i] and we[i] are assigned to be 0 and n, respectively. Therefore, the row contributes area n to the pixel.
  Rule 3: Condition_1 indicates that the left edge passes through the current row, and Condition_4 indicates that the right edge passes through the current row. When condition_1 is true, the exact number of sub-pixels of the row [i] which are covered by the edge must be determined. This is done as follows:
    Step 1: Extract the fractional part of the (xs[i]−0.5) and multiply it by n.
    Step 2: Round the resultant value to the nearest integer value from the set of [0,1,2, . . . ,n−1].
  This value is the weight of ws[i] of the row [i].

FIG. 6 illustrates the values resulting from the application of the aforementioned procedures to pixel (3,10) and pixel (10,10). Referring to pixel (3,10) at sub-pixel scan line 0, where xs[0]=2.78 and x=3, it is shown that: x−0.5<xs[0]<x+0.5, which satisfies Condition_1. Then, ws[0]=round(fract(xs[0]−0.5)x4)=round(0.28x4)=round(1.12)=1. Note that round (x) returns the rounded number of x and fract (x) returns the fractional part of x.

When Condition_4 is true, a similar procedure is applied to determine we[i], except that xs[i] is replaced by xe[i] in Step 1. Referring to pixel (10,10) at sub-pixel scan line 2, where xe[2]=9.8 and x=10, it is shown that: x−0.5<xe[2]<x+0.5, which satisfies Condition_4. Then, we[2]=round(fract(xe[2]−0.5)x4)=round(0.3x4)=round(1.2)=1.

Finally, the areas contributed by each row are accumulated into an overall sub-pixel coverage value. This sub-pixel coverage value is then normalized by multiplying by $1/n^2$, as shown in Equation (1), below:

$$\frac{1}{n^2} \times \sum_{i=0}^{n-1} (w_e[i] - w_s[i]) \quad \text{Equation (1)}$$

Referring again to FIG. 4, the sub-pixel area-coverage value ($A_C$) is outputted from the Area Coverage Computing module to the Alpha Adjustment module. The Alpha Adjustment module obtains the adjusted alpha value ($M_A$) by multiplying the area-coverage value ($A_C$) by the source alpha ($S_A$), from the Color Generator. The adjusted source alpha value ($M_A$) is then outputted from the Alpha Adjustment module to the Alpha Blending module. The Alpha Blending module blends the pixel's foreground color ($S_G$, $S_3$, $S_R$) with the background color ($D_G, D_B, D_R, D_A$) that follows the adjusted alpha value ($M_A$).

In short, a pixel based area-coverage method and apparatus are disclosed which evaluate pixel area-coverage individually, rather than on a segment basis. That is, the inventive operation aperture is the current pixel only, and not the neighboring sub-pixels within the segment. As such, the inventive pixel based technique avoids accumulating the latencies from processing other pixels, as is done in the prior art segment based area-coverage computing algorithm.

The above described embodiments of the invention are intended to be illustrative only. Numerous alternative embodiments may be devised by those skilled in the art without departing from the spirit and scope of the following claims.

What is claimed is:

1. A pixel based method for computing the area-coverage of an image bounded by edges, comprising the steps of:
   a) selecting a segment of said image for area-coverage evaluation, said segment comprising a plurality of consecutive pixels on a scan-line section which intersects at least one of said edges,
   b) dividing each of said pixels into an n by n sub-pixel array having n rows and n columns, where n is a number equal to a power of 2, said sub-pixel array having n sub-pixel scan-lines, with each sub-pixel scan-line crossing the geometric center of each row of sub-pixels,
   c) selecting one of said sub-pixel arrays to constitute a current pixel for area-coverage evaluation,
   d) determining the x-axis coordinates of the intersection points of said sub-pixel scan-lines of said current pixel with at least one of said edges of said image,
   e) comparing said x-axis coordinates of said intersection points wit the x-axis coordinate of said current pixel n-entries at a time, where $x_s[i]$ represents a starting intersection point of the ith row of sub-pixels, and $x_e[i]$ represents an ending intersection point of the ith row of sub-pixels,
   f) determining from said comparisons, n-entries at a time, an area-coverage value for each of said sub-pixel rows within said current pixel,
   g) accumulating said area-coverage values for all of said sub-pixel rows within said current pixel,
   h) normalizing said accumulated area-coverage values to determine an area-coverage value for said current pixel,
   i) outputting said area-coverage value for said current pixel, j) color processing said area-coverage value for said current pixel, and k) determining the area-coverage value of said segment of consecutive pixels on a pixel by pixel basis, wherein the operating aperture of said area-coverage determination is only one pixel at a time, which is designated as said current pixel.

2. The method of claim 1 wherein said accumulating and normalizing of steps g and h, respectively, are in accordance with the following equation:

$$\frac{1}{n^2} \times \sum_{i=0}^{n-1} (w_e[i] - w_s[i]) \qquad \text{Equation (1)}$$

where i is the number of said sub-pixel scan-line, $w_e[i]$ is the area-coverage value of the ith row at the end intersection point, and $w_s[i]$ is the area-coverage value of the ith row at the start intersection point.

3. The method of claim 1 wherein said determination of said area-coverage values of step f is in accordance with the following conditions:

(Condition_0) if xs[i]<=x−0.5, area value=0;

(Condition_1) if x−0.5<xs[i]<x+0.5, area value= fractional value of ($x_s$[i]−0.5) multiplied by n, and rounded to the nearest integer value from the set of [0,1,2, . . . ,n−1 ];

(Condition_2) if x+0.5<=xs[i], area value=0;

(Condition_3) if xe[i]<=x−0.5, area value=0;

(Condition_4) if x−0.5<xe[i]<x+0.5, area value= fractional value of ($x_e$ [i]−0.5) multiplied by n, and rounded to the nearest integer value from the set of [0,1,2, . . . ,n−1]; where x represents the geometric center of said current pixel, and x+0.5 and x−0.5 represent the right and left edges, respectively, of said current pixel; and (Condition_5) if x+0.5<=xe[i], area value=n.

4. An area-coverage computing apparatus within a 3D computer rendering engine, said area-coverage computing apparatus comprising:

a plurality of input terminals, said input terminals receiving geometric attribute signals of a segment to be evaluated for area coverage of a computer image; and an output terminal which outputs an area-coverage signal, wherein said area-coverage computing apparatus determines the area-coverage of said segment on a pixel by pixel basis, such that the operating aperture of said area-coverage computing apparatus is only one pixel at a time, which is designated as a current pixel, wherein said current pixel is sub-divided into n-by-n sub-pixels for area-coverage evaluation, which is performed n-entries at a time, wherein when a row of said sub-pixels of said current pixel is completely within the boundary edges of said computer image, a weight of n is assigned to that row, wherein when a row of said sub-pixels of said current pixel is completely outside the boundary edges of said computer image, a weight of 0 is assigned to that row, wherein when a row of said sub-pixels of said current pixel is partially outside a left boundary edge of said computer image, a fractional weight is assigned to that portion of the row inside said left boundary edge, and it is rounded up to the nearest integer, wherein when a row of said sub-pixels of said current pixel is partially outside a right boundary edge of said computer image, a fractional weight is assigned to that portion of the row inside said right boundary edge, and it is rounded up to the nearest integer, and wherein the assigned weights contributed by all said n rows of said sub-pixels of said current pixel are accumulated and normalized n-entries at a time.

5. The apparatus of claim 4 wherein said accumulated and normalized result is outputted as the area-coverage of said current pixel.

* * * * *